United States Patent [19]

Brenholt

[11] 4,438,781
[45] Mar. 27, 1984

[54] SPIRALLY WOUND FLOW CONTROL VALVE

[75] Inventor: David L. Brenholt, Dundas, Minn.

[73] Assignee: Donaldson Company, Inc., Minneapolis, Minn.

[21] Appl. No.: 231,688

[22] Filed: Feb. 5, 1981

[51] Int. Cl.³ .......................... F16K 3/00; F16K 37/00
[52] U.S. Cl. ................. 137/625.28; 251/205; 251/248; 251/DIG. 2; 251/DIG. 3; 137/553
[58] Field of Search .......... 251/DIG. 2, 248, DIG. 3, 251/205, 212; 137/1, 553, 625.28

[56] References Cited

U.S. PATENT DOCUMENTS

| 548,636 | 10/1895 | Fuller | 251/248 X |
|---|---|---|---|
| 1,029,097 | 6/1912 | Atkinson | 137/504.13 |
| 1,165,637 | 12/1915 | Thomas | 239/533.1 |
| 1,167,386 | 1/1916 | Crusius | 137/114 |
| 1,363,248 | 12/1920 | Gritzner | 251/356 |
| 2,784,740 | 3/1957 | Stageberg | 251/DIG. 2 |
| 3,119,413 | 1/1964 | Waldo | 251/294 X |
| 3,422,956 | 1/1969 | Hadden | 210/106 |
| 3,703,913 | 11/1972 | Carsten | 251/DIG. 3 |
| 3,838,708 | 10/1974 | Schule | 251/DIG. 3 |
| 3,868,991 | 3/1975 | Sheppard | 251/DIG. 3 |
| 3,957,083 | 5/1976 | Gallo | 251/DIG. 3 |
| 3,973,582 | 8/1976 | Siebold | 251/DIG. 2 X |
| 3,973,631 | 8/1976 | Hefetz | 251/DIG. 3 |
| 4,033,289 | 7/1977 | Taylor et al. | 251/DIG. 3 |
| 4,150,696 | 4/1979 | Meier | 251/DIG. 3 |

FOREIGN PATENT DOCUMENTS 981519 1/1951 France .......................... 251/DIG. 2

Primary Examiner—Arnold Rosenthal
Attorney, Agent, or Firm—Merchant & Gould

[57] ABSTRACT

A valve (20) having a flow control element (30) with a small dimension in the intended direction of fluid flow is disclosed. The element (30) is wound about an axis (32) so that, when the coils of the element (30) are tightly compressed about the axis (32), a surface (48) occluding a fluid flow aperture (24) is formed.

12 Claims, 9 Drawing Figures

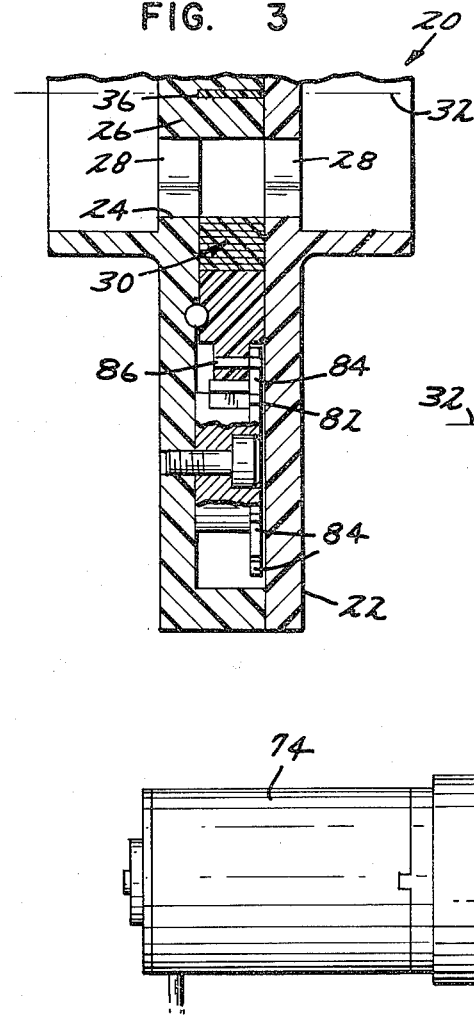
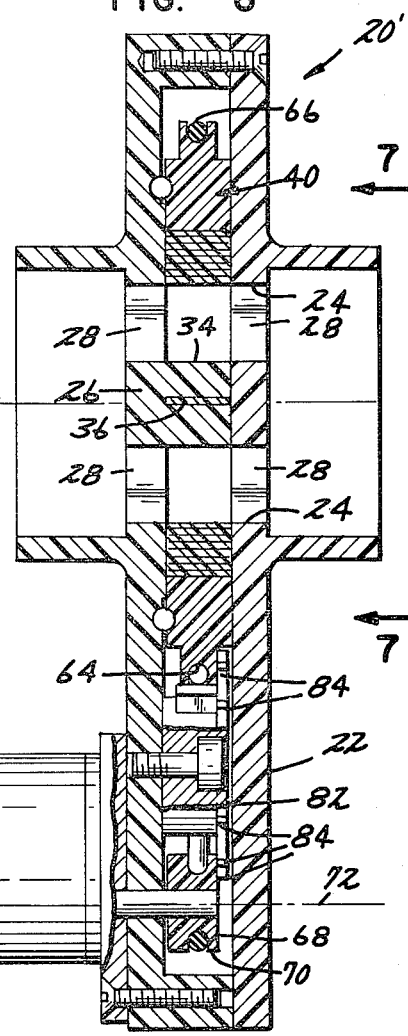
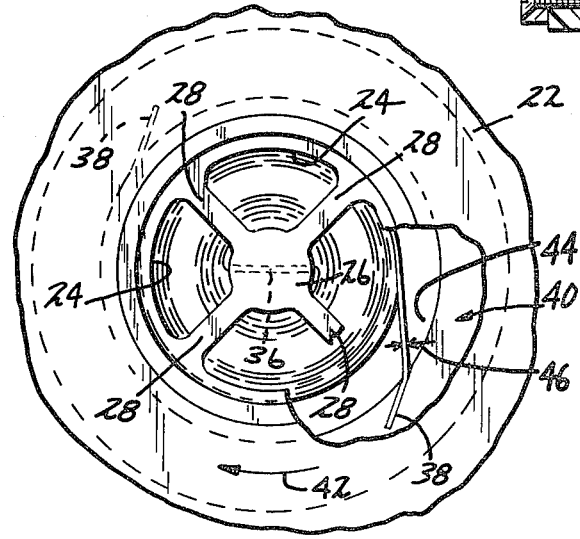
FIG. 3
FIG. 6
FIG. 7

SPIRALLY WOUND FLOW CONTROL VALVE

TECHNICAL FIELD

The invention of the present application refers broadly to the field of valves. More specifically, however, the invention relates to valves for controlling the flow rate of a fluid through a conduit and means for measuring the degree of conduit occlusion.

BACKGROUND OF THE INVENTION

Innumerable types of valves are known in the prior art. These valves are used for varied and sundry purposes. One typical use of a valve is to regulate fluid flow through a conduit.

Typical types of valves used to control fluid flow are butterfly and gate valves. Under certain circumstances, these valves are appropriate and adequately serve their function.

In systems designed for moving air, however, these types of valves frequently are inadequate. In such systems, a valve which has a very small dimension in the direction of intended flow is desirable, and these types of valves generally don't satisfy this requirement.

In response to this technological need, the scientific community has developed the iris-like valve. This valve is thin and controls the volume of fluid flow by allowing an aperture to be selectively enlarged or made smaller. The iris-like valve, however, has other drawbacks. It tends to be rather delicate, and its use is limited by the pressure of the environment under which it is to operate. Additionally, even when it is to be used within acceptable pressure parameters, it is mechanically complex and affords numerous opportunities for malfunction.

Attempts have been made to provide butterfly and ball valves which have a limited dimension in the direction of intended flow of the fluid. Even when efforts have been successful in limiting this dimension, these types of valves have proved inadequate for use in air moving systems since, because of the structural configuration of the components within the fluid flow path, distortion of fluid flow inevitably occurs.

It is to these shortcomings in the prior art that the valve of the present application is directed. It provides a structure which not only has a small dimension in the intended direction of fluid flow, but it also affords strength to resist pressures higher than do iris-like valves. Additionally, the interposition of the valve of the present application in a fluid flow conduit does not distort the flow pattern.

SUMMARY OF THE INVENTION

The invention of the present application provides a valve which includes a member for directing fluid flow. That is, fluid flow is channeled by the member through an aperture. An elongated element is spirally wound about a first axis, and the coils of the spiral winding can be compressed so that an edge of the element forms a surface. When the element is tightly compressed, the surface is substantially continuous, and the element is given a length and the edge a thickness so that the surface is large enough to completely occlude the aperture defined by the channeling ember. Means are provided for selectively compressing the element about the axis. Such compression serves to retard fluid flow through the aperture in an increasing measure as the coils are increasingly compressed. When the edge of the element forms a substantially continuous surface, fluid flow is precluded. The compression means can be operated reversly to decompress the coils of the element and to, consequently, afford increasing fluid flow.

In a prefered embodiment, a spool, coaxial with the aperture can be mounted therein. The element can be coiled about the spool for compression and decompression.

The element can be attached, at a central portion thereof, to the spool, and portions can extend from the central portion forming a pair of coils about the spool. The two remote ends of the element thereby formed can be attached at an inner radial surface of a race which is made to rotate relative to the spool.

The inner radial surface of the race can have a diameter larger than that which is provided to the aperture. A recess is thereby formed in which the outwardly urged coils of the obstruction element can be seated when the coils of the element are decompressed so as to unobstruct the aperture.

The race can, thereby, form part of a means by which the remote end, or ends, of the obstruction element is revolved about the axis to compress and decompress the coils. This means can further include means for rotating the race. The invention contemplates at least two structures for accomplishing this function. One includes a pulley member which has a grooved peripheral surface. The pulley member can be disposed in a plane generally paralell to a plane defined by the race. A continuous belt can be extended around the race and the pulley member and seated in grooved outer surfaces of these two members. Motor means can be provided to impart rotational motion to the pulley member which is, in turn, translated to the race.

The second structure which can be utilized to impart rotational motion to the race includes a worm gear which extends longitudinally generally tangentially to the race. The flighting of the worm gear is engaged with a plurality of generally radially extending teeth positioned on the peripheral surface of the race. As the worm gear is made to rotate about its longitudinal axis, rotational motion is, thereby, imparted to the race.

Additionally, the invention can include means for ascertaining the approximate measure of compression to which the coils of the control element are subjected. In one embodiment, this means can comprise structure for measuring the number of revolutions of the remote end, or ends, of the element about the first axis. A peg can be mounted to the race and be made to extend generally perpendicular to a plane defined by the race. A counter member having a plurality of spokes extending generally radially with respect to a point about which the member is mounted for rotation can be positioned proximate the race so that one of the spokes is engagable by the peg as the race rotates. The counter member will, thereby, be moved an angular amount as the peg engages and pushes one of the spokes. On subsequent rotations of the race, the peg will engage the next adjacent spoke and move it so that the next subsequent spoke will be engagable on the next rotation of the race.

The invention of this application is thus a valve which is capable of solving many of the problems in the prior art. The specific advantages of the invention will become apparent with reference to the accompanying drawings, detailed description of the invention, and claims.

BRIEF DESCRIPTION OF THE DRAWINGS

FIG. 3 is a view taken along the line 3—3 in FIG. 1;

FIG. 6 is a view taken along the line 6—6 of FIG. 4;

FIG. 7 is a view taken along the line 7—7 of FIG. 6, some portions thereof broken away;

DETAILED DESCRIPTION OF THE INVENTION

Figure 1:
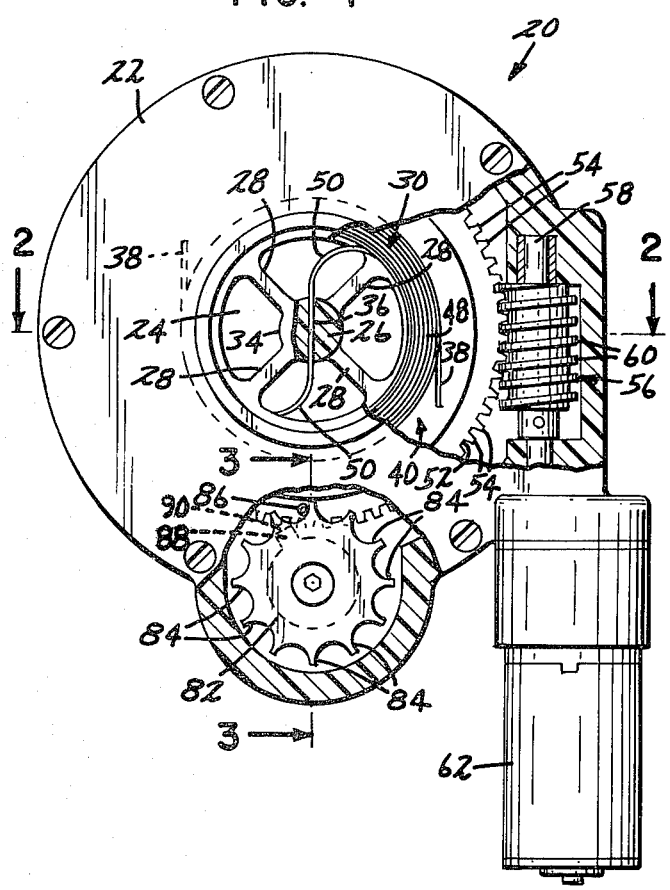
FIG. 1 is a side elevational view of the invention in accordance with the present application illustrating one embodiment of means for rotating a race relative to a spool mounted centrally therewith, some portions thereof broken away.

Refering now to the drawings wherein like reference numerals denote like elements throughout the several views, FIG. 1 illustrates a valve 20 in accordance with the present invention. A channeling member 22 is shown defining an orifice or aperture 24 therethrough. As will be discussed hereinafter, although it is not essential to the invention, a spool 26 can be mounted centrally in the aperture 24 for a purpose to be designated. This spool 26 can be maintained in its position in the aperture 24 by use of a plurality of spider legs 28.

It will be understood that the channeling member 22 can be interposed in a conduit such as a fluid flow pipe with the aperture 24 registering with the passage through the pipe. The pipe might extend, with respect to the channeling member 22, in a direction generally transverse to the plane of FIG. 1. Fluid flow through the pipe can, thereby, be selectively obstructed and facilitated by controlling the measure of occlusion of the aperture 24 by an elongated control element 30.

The control element 30 can be a watch-spring like structure coiled with respect to a first axis 32. The axis 32 with respect to which the control element 30 is coiled can be the longitudinal axis of the spool 26 about which the element 30 is wound, if a spool is used.

Coils of the element 30 are compressably wound about the axis 32, and a portion of the element 30 can be held at the axis 32 or the peripheral surface 34 of the spool, when one is used. The control element 30 as illustrated in FIG. 1 is elongated and has a measureable thickness extending in the plane of the aperture 24. A central portion 36 of the element 30 is held at the spool 26 and opposite remote ends 38 of the element 30 extend spirally about the spool 26. Such a configuration provides, in essence, two seperate control elements extending radially outwardly from diametrically opposed points on the spool 26.

The spool 26 in FIG. 1 is maintained rigid with respect to the channeling member 22 and is not permitted to rotate. The remote ends 38 of the control element 30 are caused to be revolved about the spool 26 selectively in opposite directions. This can be accomplished by mounting a race 40, coaxial with the circular aperture 24 and spool 26, for rotation about the aperture 24. The race 40 has an inner diameter which is shown as being larger than the diameter of the aperture 24, and the spool 26 has a diameter smaller than that of the aperture 24. The remote ends 38 of the control element 30 can be attached to the race 40 at diametrically opposed locations on the inner diameter thereof. As the race 40 is rotated in a first direction, as indicated by arrow 42 in FIG. 7, coils of the control element 30 will be urged radially inwardly to compress about the spool 26. As it is rotated in a second direction, the coils will be urged radially outwardly to compress in that direction.

The relative sizes and positioning of the spool 26 and aperture 24 form a substantially annular flow passage interrupted only by the spider legs 28. The relative sizes and positioning of the aperture 24 and the race 40 define an annular recess 44 radially outward from the aperture 24 and within the confines of the race 40.

As the race 40 is rotated in its first direction, the coils of the control element 30 will, as previously stated, be compressed radially inwardly and tightly about the spool 26. The control element 30 is given a length and its edge has a thickness 46 such that, when the element 30 is compressed about the spool 26, the edge forms a substantially continuous surface 48 completely occluding the flow passage.

As the race 40 is rotated in its second direction the coils of the element 30 are urged into the recess 44 formed radially outwardly of the aperture 24. The race 40 can be given an inner diameter such that, as it is rotated in its second direction and all of the coils are compressed outwardly, only tailing ends 50 of the element 30 will be disposed within the aperture 24. This is best illustrated in FIG. 1. Thus, when maximum flow is desired through the aperture 24, it will be obstructed only by the spider legs 28 and these trailing ends 50.

Figure 2:
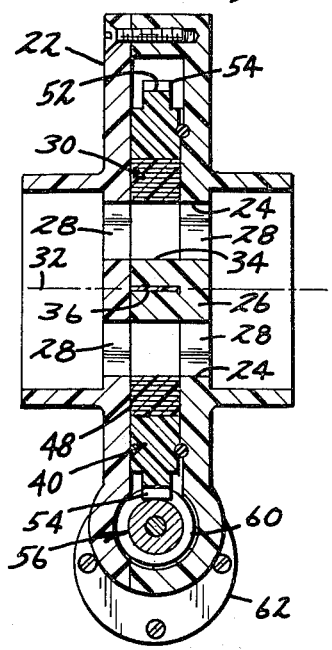
FIG. 2 is a view taken along the line 2—2 in FIG. 1.

A first means for rotating the race 40 is illustrated in FIGS. 1 and 2. An outer peripheral surface 52 of the race 40 is provided with a plurality of radially extending gear teeth 54 formed completely around this outer surface 52. A motor powered worm gear 56 is disposed with its longitudinal axis 58 spaced slightly from a tangent to the outer surface 52 of the race 40 so that the flighting 60 of the worm gear 56 meshes with the gear teeth 54. A motor 62 can be provided to selectively rotate the worm gear 56 in opposite directions about its longitudinal axis 58. As the worm gear 56 is rotated in one direction, the race 40 will be caused to be rotated in its first direction; as the worm gear 56 is rotated in an opposite direction, the race 40 will be caused to be rotated in its second direction.

Figure 4:
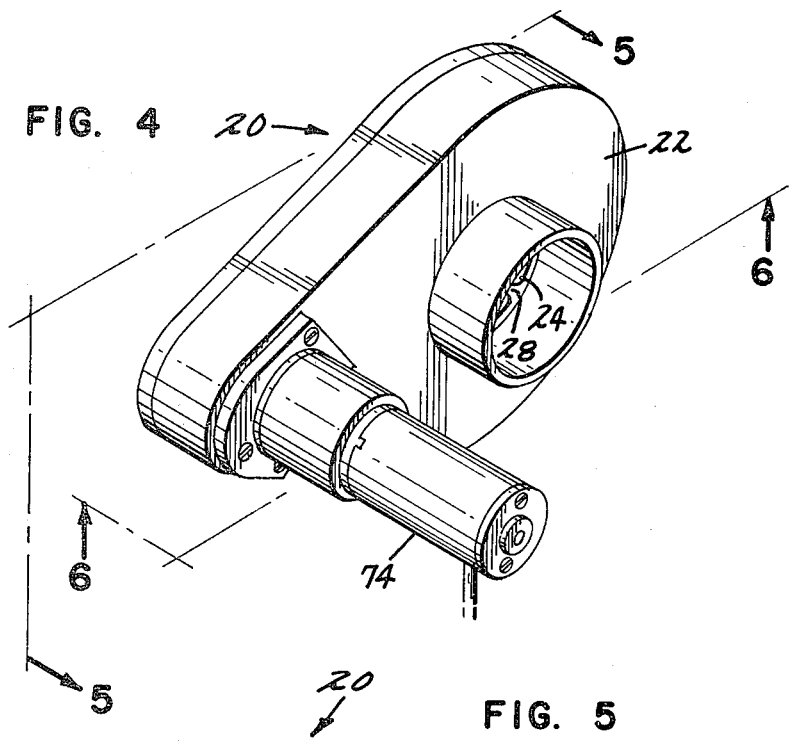
FIG. 4 is a rear perspective view of the invention in accordance with the present application, in which invention alternative means for rotating the race relative to the spool is illustrated.
Figure 5:
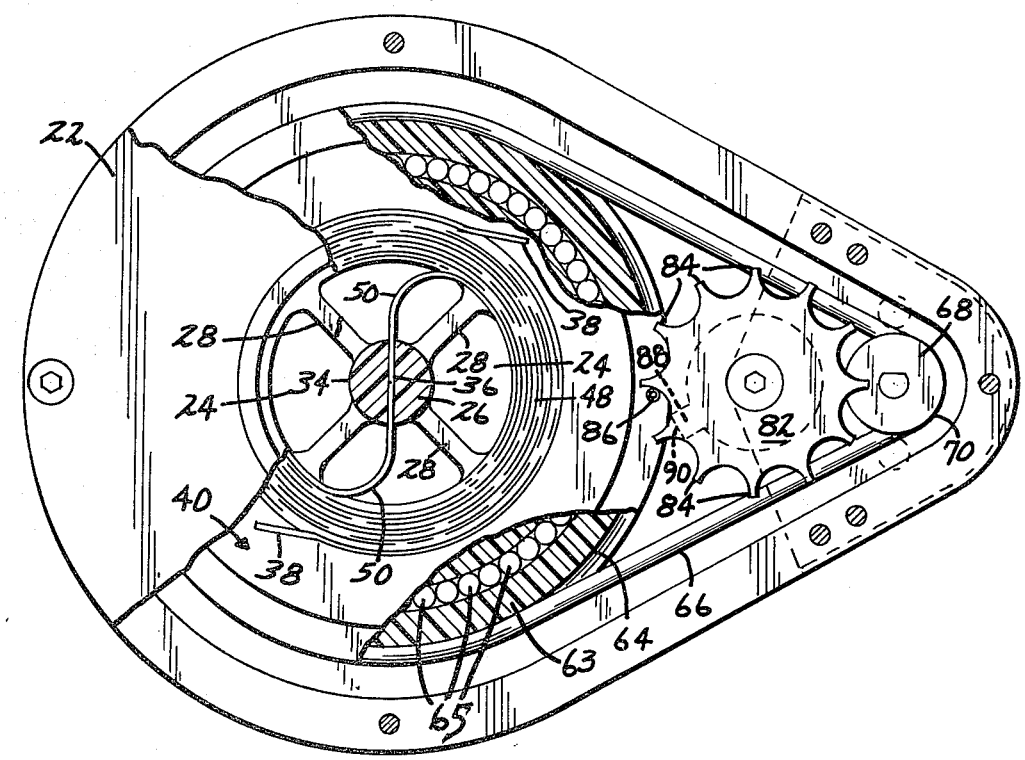
FIG. 5 is a view taken generally along the line 5—5 of FIG. 4, some portions broken away.

The embodiment illustrated in FIGS. 4, 5, and 6 utilizes an alternative means for rotating the race 40. With that embodiment, the race 40 is encircled by an outer race 63 having a grooved rim 64. Race 40 and race 63 can be maintained in place relative to one another by use of a plurality of ball bearing elements 65 seated in both an annular channel in the outer radial surface of race 40 and an annular channel in the inner radial surface of race 63. Bearing elements 65 can also served to convey rotational motion imparted to race 63 to race 40.

A continuous belt 66 is received in grooved rim 64. A pulley member 68 defining a plane generally parallel to, and aligned with, the plane of the race 40 is mounted proximate the race 40. The pulley member 68 is also provided with a grooved peripheral surface 70 in which the continuous belt 66 is also seated. The pulley member 68 is mounted for rotation about a second axis 72 which can extend generally parallel to the first axis 32 with respect to which the control element 30 is coiled. Motor means 74 can be provided for driving the pulley member 68 about the second axis 72. As the pulley member 68 is driven, its rotational motion will be translated, through the belt 66, to the race 40. In certain embodiments of the invention, it has been found appropriate to utilize an o-ring seal type continuous belt 66 to drive the race 40.

Figure 9:
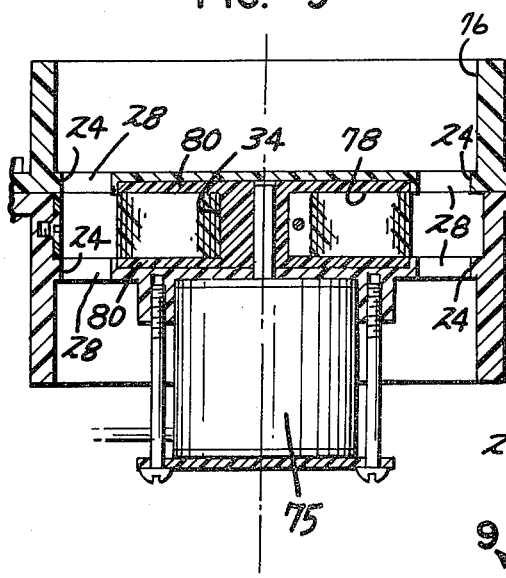
FIG. 9 is a view taken along the line 9—9 of FIG. 8.
Figure 8:
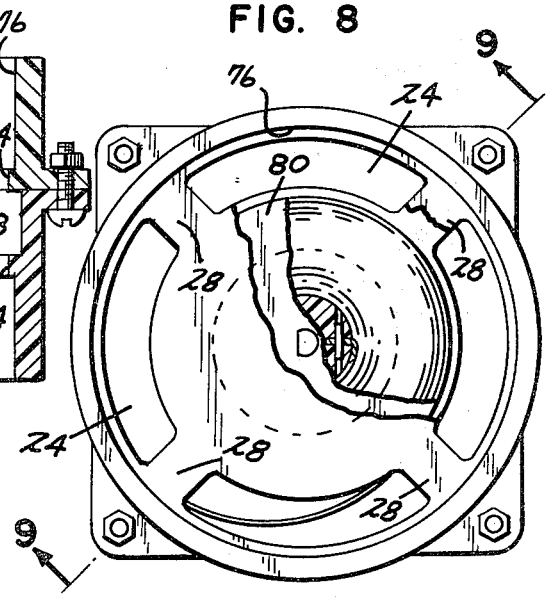
FIG. 8 illustrates an alternative embodiment wherein the flow control element occludes the orifice or aperture when it is compressed radially outward, some portions thereof broken away.

An alternative embodiment of the valve is illustrated in FIGS. 8 and 9. The structure of that alternative varies from that illustrated in FIGS. 1 through 7 in that the flow passage is disposed more radially outwardly. Additionally, a single coiled control element 30 is shown in these figures, and the spool 26 on which the element 30 is coiled is made to rotate with respect to the rest of the valve 20 to effectuate inward and outward compression of the coils rather than providing a rotating race 40 as in the embodiment previously described. A motor 75 can be provided for this purpose. Rather than the remote ends 38 of the control element 30 being mounted to the inner radial surface of a race 40, they are mounted at diametrically opposed points on an inner cylindrical wall 76 of the valve 20. As the spool 26 is selectively rotated in opposite directions by actuation of power means, such as a motor, the coils of the control element 30 will be compressed radially inwardly and outwardly as with the first embodiment. The flow passage is, however, disposed at a location proximate the inner cylindrical wall 76 of the valve 20 so that it is occluded when the coils are compressed outwardly. The annular recess 78, with this embodiment, is defined between a pair of generally parallel flanges 80 extending radially outwardly from the spool 26. When the coils are compressed radially inwardly into this recess 78, the flow passage is unobstructed, and flow therethrough is facilitated.

A third embodiment specifically contemplated comprises a structure wherein the control element 30 is run from one spool to another as opening and closing of the valve 20 is desired. One spool is positioned with respect to the aperture 24 such that, when the control element 30 is wound about it, the aperture 24 will be occluded. When the control element 30 is unwound from the first spool and onto the second spool, the valve 20 will be increasingly opened.

In all embodiments described, the dimension of the control element 30 extending in an axial direction or the direction of intended fluid flow can be made as great or as small as desired. It will be apparent, therefore, that an uncomplicated, strong valve occlusion element 30 is, thereby, provided even though the axial dimension can be small.

The invention can include means for ascertaining the measure of aperture occlusion which is provided with the control element 30 in any particular configuration. Since the measure of occlusion is directly proportional to the degree of compression of the coils of the control element 30, rate of fluid flow provided by the valve 20 can be approximated by registering the degree of coil compression.

A structure by which this can be accomplished is illustrated in both FIGS. 1 and 5. In those figures, the structure by which coil compression is effectuated comprises the race 40 rotatable with respect to the control element mounting spool 26. The structure for registering the control element coil compression includes a counter member 82 having a plurality of spokes 84 extending generally radially outward from a central location on the member 82 at which it is rotatably mounted. A peg 86 is mounted to the race 40 for rotation therewith. As shown in FIGS. 1 and 5, the peg 86 is mounted near the periphery of the race 40. The counter member 82 is disposed at a position relative to the race 40 so that, as the race 40 rotates, the peg 86 will engage a single one of the radially extending spokes 84 and rotate the counter member 82 to a position wherein the next adjacent spoke will be engagable by the peg 86 as the race 40 rotates through 360 degrees.

In the preferred embodiment illustrated, the peg 86 is made to extend generally perpendicular to the plane defined by the race 40. Additionally, the counter member 82 is generally planar in nature, and the plane defined by the counter member 82 is generally parallel to that defined by the race 40.

The counter member 82 can include indicia (not shown) so that each spoke 84 can be differentiated from the others. The counter member 82 can be mounted for rotation so that a spoke 84, having a base indicia such as zero, is engagable by the peg 86 when the valve 20 is completely closed. The indicia can comprise an increasing number system so that immediately adjacent spokes 84 are numbered one higher than the immediately previous ones. The higher the number of the spoke 84 engageably by the peg 86, the less the degree of occlusion of the aperture 24.

It will be understood, however, that the indicia system discussed immediately above is merely for purposes of illustration. Numerous other systems are conceivable and can be adapted for measuring the degree of fluid flow allowed by the valve 20.

In embodiments wherein opening and closing of the valve is effected by rotation of race 40, counter member 82 can carry means for precluding further rotation of race 40 once aperture 24 becomes completely unoccluded except for the tailing ends 50 of element 30. The means can comprise a tab 88 extending generally radially on counter member 82. As the valve becomes completely open, an outer surface 90 of tab 88 will, in the embodiment of FIGS. 1 and 2, engage outer surface 52, and, in the embodiment of FIGS. 4, 5, and 6, engage grooved rim 64. It will be understood that tab 88 will be positioned at an angular position on counter member 82 so that it will engage either outer surface 52 or grooved rim 64 only when the valve is completely open.

Numerous characteristics and advantages of the invention have been set forth in the foregoing description. It will be understood, however, that this disclosure is, in many respects, only illustrative. Changes may be made in details, particularly in matters of shape, size, and arrangement of parts. The scope of the invention is defined in the language in which the appended claims are expressed.

What is claimed is:

1. A fluid flow control valve, comprising:
 (a) a conduit member having an orifice formed therethrough, through which orifice a fluid can be conducted;
 (b) first axis extending through said orifice and being oriented substantially aligned with an intended direction of fluid conduction;
 (c) an elongated control element having a portion thereof fixed at said first axis, an axial edge, and a remote end, said element being coiled about said first axis with said remote end disposed for revolution about said first axis selectively in opposite directions, wherein, as said remote end is revolved in a first direction, said element is wound tightly radially inwardly toward said first axis so that said axial edge can form a substantially continuous surface occluding said orifice when a sufficient measure of compression is achieved; and (d) means for imparting said selective revolving motion to said remote end.

2. A valve in accordance with claim 1 further comprising a race defining a plane generally perpendicular to said first axis and being disposed for rotation thereabout, said race having an inner radial surface by which said remote end of said control element is held.

3. A valve in accordance with claim 2 wherein said means for imparting said selective revolving motion to said remote end comprises:

(a) said race; and
(b) means for rotating said race about said first axis.

4. A valve in accordance with claim 3 wherein said race has an outer radial surface comprising a grooved rim and wherein said means for rotating said race about said first axis comprises:

(a) a pulley member having a grooved peripheral surface aligned axially with said grooved rim of said race, said pulley member being disposed for rotation about a second axis spaced laterally from said first axis;
(b) a continuous belt running about said race and said pulley member and seated in said grooved rim and said grooved peripheral surface; and
(c) motor means for selectively rotating said pulley member about said second axis.

5. A valve in accordance with claim 3 wherein said race has an outer radial surface having a plurality of radially extending gear teeth and wherein said means for rotating said race about said first axis comprises:

(a) a worm gear engaged with said gear teeth of said race, said worm gear disposed for rotation about a longitudinal axis; and
(b) motor means for selectively rotating said worm gear about its longitudinal axis.

6. A valve in accordance with claim 2 further comprising means for ascertaining the approximate measure of coiling compression to which said control element is subjected.

7. A valve in accordance with claim 6 wherein said ascertaining means comprises means for measuring the number of revolutions of said remote end about said first axis.

8. A valve in accordance with claim 7 wherein said revolution measuring means comprises:

(a) a counter member having a rotational mounting point and a plurality of spokes extending generally radially from said point; and (b) a peg extending from said race and being engageable with one of said spokes as said race rotates about said first axis;
(c) wherein said counter member is made to rotate as one of said spokes is engaged by said peg and wherein the number of revolutions of said remote end is measured by which of said plurality of spokes is engageable by said peg.

9. A valve in accordance with claim 8 wherein said spokes define a plane generally parallel to said plane defined by said race and wherein said peg extends generally perpendicularly with respect to said plane defined by said race.

10. A fluid flow control valve, comprising:

(a) a member defining a circular fluid flow passage therethrough, said passage having a diameter and a central longitudinal axis;
(b) a spool mounted in said passage and coaxial therewith, said spool having a diameter smaller than said diameter of said passage;
(c) a race, coaxial with said passage, positioned axially aligned with said spool, said race having an inner diameter greater than said diameter of said passage to define an annular recess radially intermediate said diameter of said passage and said inner diameter of said race;
(d) said spool and said race being disposed for rotational motion with respect to said axis relative to one another;
(e) a watchspring-like element having a central portion retained at said spool, opposite ends retained at diametrically opposed locations of said race, and an axial edge, said element being coiled about said spool wherein, as said race is rotated relative to said spool in a first direction, coils of said element are urged inwardly toward said spool, and, as said race is rotated relative to said spool in a second opposite direction, said coils are urged into said recess; and
(f) means for selectively imparting said relative rotational motion.

11. A valve in accordance with claim 10 wherein said axial edge of said coiled element forms a substantially continuous surface when said element is compressed radially inwardly, in response to relative rotation of said spool and said race in a first direction, to form a tight coil, and wherein said element has a length and said edge has a thickness, both of sufficient measure, so that said substantially continuous surface comletely occludes said orifice.

12. A valve in accordance with claim 11 wherein said coiled element has an axial dimension significantly smaller than said diameter of said spool.

* * * * *